(12) United States Patent
Petitdemange

(10) Patent No.: US 10,821,950 B2
(45) Date of Patent: Nov. 3, 2020

(54) VEHICLE BRAKING SYSTEM COMPRISING A HANDLE AND A BRAKE CABLE

(71) Applicant: DECATHLON, Villeneuve d'Ascq (FR)

(72) Inventor: David Petitdemange, Ennevelin (FR)

(73) Assignee: DECATHLON, Villeneuve d'Ascq (FR)

( * ) Notice: Subject to any disclaimer, the term of this patent is extended or adjusted under 35 U.S.C. 154(b) by 28 days.

(21) Appl. No.: 16/067,160

(22) PCT Filed: Jan. 9, 2017

(86) PCT No.: PCT/FR2017/050043
§ 371 (c)(1),
(2) Date: Jun. 29, 2018

(87) PCT Pub. No.: WO2017/121948
PCT Pub. Date: Jul. 20, 2017

(65) Prior Publication Data
US 2019/0016320 A1    Jan. 17, 2019

(30) Foreign Application Priority Data
Jan. 12, 2016   (FR) ...................................... 16 50230

(51) Int. Cl.
*B60T 11/04*      (2006.01)
*B62L 3/02*       (2006.01)
(Continued)

(52) U.S. Cl.
CPC .............. *B60T 11/046* (2013.01); *B60T 7/10* (2013.01); *B60T 7/102* (2013.01); *B62K 9/00* (2013.01);
(Continued)

(58) Field of Classification Search
CPC ......... B62K 23/06; B62K 9/00; B60T 11/046; B60T 7/10; B60T 7/102; B62L 3/02
(Continued)

(56) References Cited

U.S. PATENT DOCUMENTS 3,176,536 A * 4/1965 Altenburger ............... B62L 3/02
                                                    74/489
4,066,147 A * 1/1978 Toyomoto ................. B62L 1/12
                                                    184/15.1
(Continued)

FOREIGN PATENT DOCUMENTS

EP      2594469 A1     5/2013
FR      2982837 A1 *   5/2013
(Continued)

*Primary Examiner* — Thomas J Williams
*Assistant Examiner* — James K Hsiao
(74) *Attorney, Agent, or Firm* — Bookoff McAndrews, PLLC

(57) ABSTRACT

The invention relates to a braking device (10) for a vehicle having a handlebar and a brake cable (C), said device comprising a support (18) provided with a fastener sleeve (20) and including a receiving cavity (19) for receiving the nipple (Ca) of the brake cable, said device further comprising a pivot body (24) mounted to pivot about a pivot axis (Y), the pivot body comprising both a brake handle (26) and also a guide member (34) for guiding the brake cable into the pivot body and extending along an axis (Z), the axis of the guide member extending transversely relative to a plane (P) that is perpendicular to the pivot axis, and the guide member and the brake handle extending on opposite sides of the support.

16 Claims, 5 Drawing Sheets

(51) Int. Cl.
*B60T 7/10* (2006.01)
*B62K 9/00* (2006.01)
*B62K 23/06* (2006.01)
*G05G 1/04* (2006.01)
*F16D 125/60* (2012.01)
*F16D 125/64* (2012.01)

(52) U.S. Cl.
CPC ............... *B62K 23/06* (2013.01); *B62L 3/02* (2013.01); *G05G 1/04* (2013.01); *F16D 2125/60* (2013.01); *F16D 2125/64* (2013.01)

(58) Field of Classification Search
USPC ...................................................... 188/24.11
See application file for complete search history.

(56) References Cited

U.S. PATENT DOCUMENTS

| | | | | |
|---|---|---|---|---|
| 4,632,225 | A * | 12/1986 | Mathauser | B62L 3/023 188/24.18 |
| 5,437,206 | A * | 8/1995 | Boor | B62K 23/04 188/24.22 |
| 5,850,761 | A * | 12/1998 | Sugimoto | B62K 21/125 74/489 |
| 6,612,406 | B1 * | 9/2003 | Romak | B60T 7/10 180/272 |
| 2002/0033064 | A1 * | 3/2002 | Ose | B62K 23/02 74/502.2 |
| 2004/0020322 | A1 * | 2/2004 | Hsieh | A61H 3/04 74/502.2 |
| 2007/0131495 | A1 * | 6/2007 | Matsushita | B60T 7/10 188/24.22 |
| 2011/0167949 | A1 * | 7/2011 | Tsai | F16C 1/14 74/502.2 |
| 2014/0109718 | A1 * | 4/2014 | Tan | B62M 25/04 74/523 |
| 2017/0088234 | A1 * | 3/2017 | Komada | B62K 23/06 |

FOREIGN PATENT DOCUMENTS

| | | |
|---|---|---|
| FR | 2982837 A1 | 5/2013 |
| JP | 2007 030584 A | 2/2007 |
| WO | 90/14974 A2 | 12/1990 |

* cited by examiner

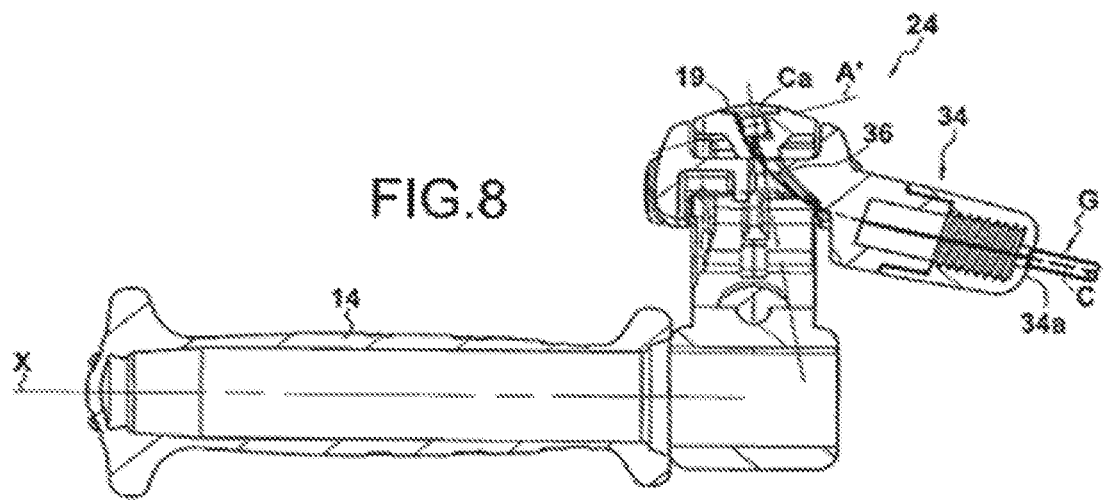
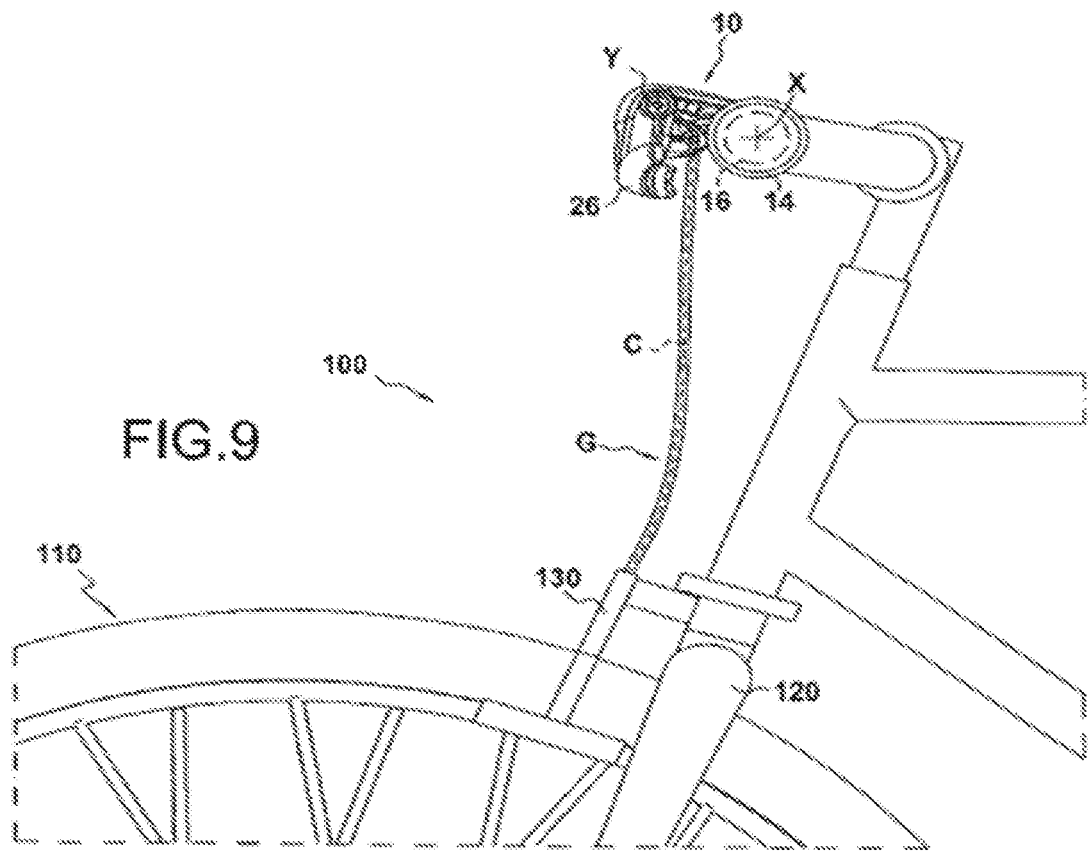

VEHICLE BRAKING SYSTEM COMPRISING A HANDLE AND A BRAKE CABLE

RELATED APPLICATIONS

This application is a US national phase entry of PCT/FR2017/050043, filed Jan. 9, 2017, and claiming priority to French National application FR1650230, filed Jan. 12, 2016.

FIELD

The present disclosure relates to the field of vehicles, in particular wheeled vehicles and specifically cycles, e.g. bicycles.

It relates more particularly to a braking device of a vehicle, in particular a wheeled vehicle having at least one handlebar with an axis and at least one brake actuatable via a brake cable having a nipple.

BACKGROUND

Braking devices are known, comprising:
  a support presenting both a first end provided with a fastener sleeve for fastening to the handlebar, the fastener sleeve having an axis, and also a second end; and
  a pivot body mounted on the support so as to pivot about a pivot axis that is substantially parallel to the axis of the fastener sleeve, the pivot body including a brake handle extending substantially parallel to the axis of the fastener sleeve.

Document EP 2 594 469 describes such a braking device, fitted to bicycles for children, in which the pivot body includes a cavity for receiving the nipple of the brake cable and the support is provided with a guide member for guiding the brake cable into the support, so that actuating the brake handle serves to pull on the brake cable, which causes the vehicle to brake. In particular, that device enables children with small hands to grip the brake handle and to apply the force required for braking easily.

In contrast, the guide member of that type of braking device extends from the support, substantially perpendicularly to the pivot axis, projecting towards the front of the vehicle. Also, the guide member is bulky and it is necessary to limit its size.

In addition, the position of that guide member also implies that the brake cable extends forwards from the braking device, which makes it even more bulky. In particular, there is a risk that the brake cable will get in the user's way when the user actuates the brake handle.

SUMMARY

According to embodiments of the disclosure, a braking device for a vehicle having a handlebar and a brake cable, is provided. The device aids in overcoming the above-mentioned drawbacks and in particular enables the guide member and the brake cable to be more compact.

Embodiments of the disclosure achieve this by the fact that the pivot body further includes a guide member for guiding the brake cable into the pivot body, said guide member extending along an axis that is transverse to a plane that is perpendicular to the pivot axis, by the fact that the second end of the support includes a receiving cavity for receiving the nipple of the brake cable, and by the fact that the guide member and the brake handle extend on opposite sides of the support.

The fastener sleeve makes it possible to fasten the support to the handlebar of the bicycle, in such a manner that the axis of the fastener sleeve coincides with the axis of the handlebar. In this way, the support is held stationary relative to the handlebar. Contrary to prior art devices, in the braking device according to embodiments of the disclosure, the receiving cavity is provided in the support while the guide member is secured to the pivot body. In this configuration, the brake cable enters the pivot body via the guide member and extends inside the pivot body while the nipple of the brake cable is held stationary in the receiving cavity provided in the support.

Without going beyond the ambit of the disclosure, the handlebar may be provided with a grip handle making it possible for the user to manipulate the handlebar and thus steer the vehicle.

In non-limiting manner, the braking device may take up at least two different positions: a rest position in which the brake handle is not actuated, the pivot body being located in the vicinity of the receiving cavity, and an actuated position in which the brake handle is actuated, the pivot body being pivoted in such a manner as to be moved towards the first end of the support, and thus towards the grip handle.

In particular, the brake cable is located in a sheath having one end that co-operates with the guide member, e.g. by being housed in the guide member. Thus, when the brake handle is actuated, the pivot body pivots about the pivot axis, which has the effect of modifying the position of the guide member. Consequently, the guide member exerts a thrust force on the sheath, while the nipple of the brake cable is held in place, which leads to the brake cable moving relative to the sheath, the cable coming out from said sheath, which leads to said braking of the vehicle.

The brake handle is located parallel to the axis of the fastener sleeve and thus to the axis of the handlebar, in such a manner that the distance between the brake handle and the handlebar is substantially the same over the entire length of the brake handle. Children with small hands are thus able to grip the brake handle over its entire length.

In addition, it should be understood that the axis of the guide member extends laterally and not towards the front of the vehicle as can be seen in the prior art. An advantage is to make the guide member more compact.

The brake handle and the pivot axis are substantially parallel to the axis of the fastener sleeve, in such a manner that the brake handle and the pivot axis are substantially parallel to each other. Consequently, the brake handle is also perpendicular to said plane that is perpendicular to the pivot axis. The guide axis and the brake handle are therefore both transverse to said plane that is perpendicular to the pivot axis.

Also, the fact that the guide member and the brake handle extend on opposite sides of the support requires the brake cable and the brake handle to extend in opposite directions. The brake cable therefore extends on one side of the plane that is perpendicular to the pivot axis while the brake handle extends on the other side so that there is no risk of the brake cable getting in the user's way when the user actuates the brake handle.

Preferably, the guide member and the brake handle are located on opposite sides of a plane that is perpendicular to the axis of the fastener sleeve and that passes via the receiving cavity. The advantage is that the receiving cavity is located between the brake handle and the guide member and that the guide member is located substantially transversely relative to the receiving cavity.

In advantageous manner, the support presents a bend portion formed between the first end of the support and the second end of the support, and the pivot axis passes through the bend portion.

It should be understood that the bend portion is arranged so that the pivot axis is situated above the first set of phalanges of the user's hand. An advantage is to make the braking device more ergonomic since the path followed by the brake handle corresponds to the natural movement of the fingers during braking, and in particular to the movement of the third set of phalanges.

Advantageously, the support includes an outer surface into which the receiving cavity opens out. It should be understood that the nipple of the brake cable is thus held in the support in such a manner that the support exerts a force on the nipple of the brake cable, which force is directed outwards from the support. In other words, the nipple of the brake cable is held in the receiving cavity and thus faces away from the fastener sleeve.

Preferably, the fastener sleeve and the receiving cavity are located on opposite sides of a plane containing the pivot axis and passing through the guide member.

In a particularly advantageous aspect of the disclosure, the receiving cavity is shaped in such a manner that, between the receiving cavity and the guide member, the brake cable presents a curve through an angle that is greater than 90° inside the pivot body. The curve is the salient angle that is defined between the axis of the guide member and the direction of the brake cable at the outlet of the receiving cavity. The advantage of this curve of the brake cable is to limit friction of the brake cable in the pivot body and thus to limit the forces that need to be applied on the brake handle in order to brake the vehicle. In this configuration, it should be understood that the continuity of the curve of the brake cable is not broken by an angle that is too sharp, and that makes it possible to limit friction between the brake cable and the pivot body and to facilitate braking.

Preferably, the receiving cavity includes an end wall of partly cylindrical shape presenting an axis, the end wall being configured to receive the nipple of the brake cable. An advantage is to allow the nipple of the brake cable to pivot about the axis of the end wall of the receiving cavity. This pivoting of the nipple of the brake cable makes it possible to adapt to the movement of the brake cable in the pivot body.

When the brake handle is actuated, the pivot body pivots about the pivot axis and the brake cable is caused to slide in the pivot body. The nipple of the brake cable thus pivots in the receiving cavity in such a manner as to adapt to the movement of the brake cable. The end wall of partly cylindrical shape makes it possible for the nipple of the brake cable to adapt to the movement of the brake cable, and that limits friction and further facilitates braking.

In particularly advantageous manner, the axis of the end wall of the receiving cavity is inclined relative to the pivot axis, by means of which the nipple of the brake cable adapts more efficiently to the movement of the cable in the pivot body. In particular, during actuation of the brake handle, the pivot body pivots about the pivot axis, whereas the nipple of the brake cable is held in position in the receiving cavity of the support. As a result, the brake cable is caused to slide in the pivot body. By means of the angle of inclination of the axis of the end wall of the receiving cavity relative to the pivot axis, the nipple of the brake cable pivots in the receiving cavity in such a manner that the brake cable remains in a plane containing the axis of the cylindrical end wall, i.e. in the axis of the nipple of the brake cable. An advantage is to avoid twisting of the brake cable, and that facilitates the braking operation.

Advantageously, when considered in a plane that is perpendicular to the pivot axis, the guide member is located between the pivot axis and the axis of the fastener sleeve.

In advantageous manner, when considered in said plane that is perpendicular to the pivot axis, the guide member is located between the pivot axis and the brake handle.

In other words, when considered in projection onto the plane that is perpendicular to the pivot axis, the guide member lies in a triangle formed by the fastener sleeve, the pivot axis, and the brake handle. An advantage is to confine the guide member in a volume defined by said triangle and extending along the handlebar of the vehicle, said volume defining substantially a prism on a triangular base. This configuration enables the guide member to be more compact and in particular to avoid projecting towards the front of the vehicle. In particular, this configuration makes it possible to increase the dimensions of the guide member without damaging the ergonomics of the braking device.

Preferably, the salient angle between the guide axis and the plane that is perpendicular to the pivot axis lies in the range 45° to 90°.

Considered from the plane that is perpendicular to the pivot axis, the guide member extends towards the axis of the fastener sleeve.

Preferably, the guide member includes a thumbwheel for adjusting the tension of the brake cable. As well as guiding the cable in the pivot body, the guide member therefore makes it possible to adjust the brake cable tension. The number of parts required for performing these operations is thus limited and the overall size of the braking device is thus limited.

Again preferably, the pivot body includes an inner recess for guiding the brake cable extending between the receiving cavity and the guide member. Again, during actuation of the brake handle, the pivot body pivots about the pivot axis whereas the nipple of the brake cable is held in position in the receiving cavity of the support. As a result, the brake cable is caused to slide in the pivot body. An advantage of the inner recess is therefore to guide the brake cable in the pivot body while at the same time promoting sliding of the cable in the pivot body. In particular, in non-limiting manner, the inner recess may comprise a smooth side wall configured in such a manner that the brake cable presses tangentially in sliding on said wall. It should be understood that the inner recess facilitates braking by limiting the friction between the brake cable and the pivot body, while guiding the brake cable.

Advantageously, the cross-section of said inner recess increases going from the guide member towards the receiving cavity. An advantage is to improve sliding of the brake cable in the pivot body. This configuration makes it possible in particular for the brake cable to slide upwards in the inner recess, in a direction transverse to said recess. It should thus be understood that the cable is guided more efficiently and that friction between the brake cable and the inner recess are further reduced.

Preferably, a return spring is mounted between the support and the pivot body, and is arranged so as to return the braking device to a rest position when the brake handle is not actuated. An advantage is that it is not necessary to exert a force on the brake handle in order to place the braking device in the rest position. Furthermore, the braking device cannot remain blocked in the actuated position, which would prevent the vehicle from being used.

Embodiments of the disclosure also provide a wheeled vehicle having at least one wheel secured to a frame including a handlebar and at least one brake associated with said wheel and actuatable via a brake cable having a nipple, said brake cable being located inside a sheath, said vehicle further including a braking device as described above, the brake cable passing through the guide member and the nipple of the brake cable being located in the receiving cavity, a first end of the sheath being housed in the guide member while a second end of the sheath is fastened to the brake.

Without going beyond the ambit of the disclosure, the vehicle could be a motorized two-wheeled vehicle, or also a kick scooter.

BRIEF DESCRIPTION OF THE DRAWINGS

The disclosure can be better understood on reading the following description of an embodiment of the disclosure given by way of non-limiting example, with reference to the accompanying drawings, in which:

FIG. 8 is a section view, from below, in the rest position, showing the routing of the brake cable in the pivot body; and FIG. 9 shows a wheeled vehicle including a braking device according to embodiments of the disclosure.

DETAILED DESCRIPTION

Figure 1:
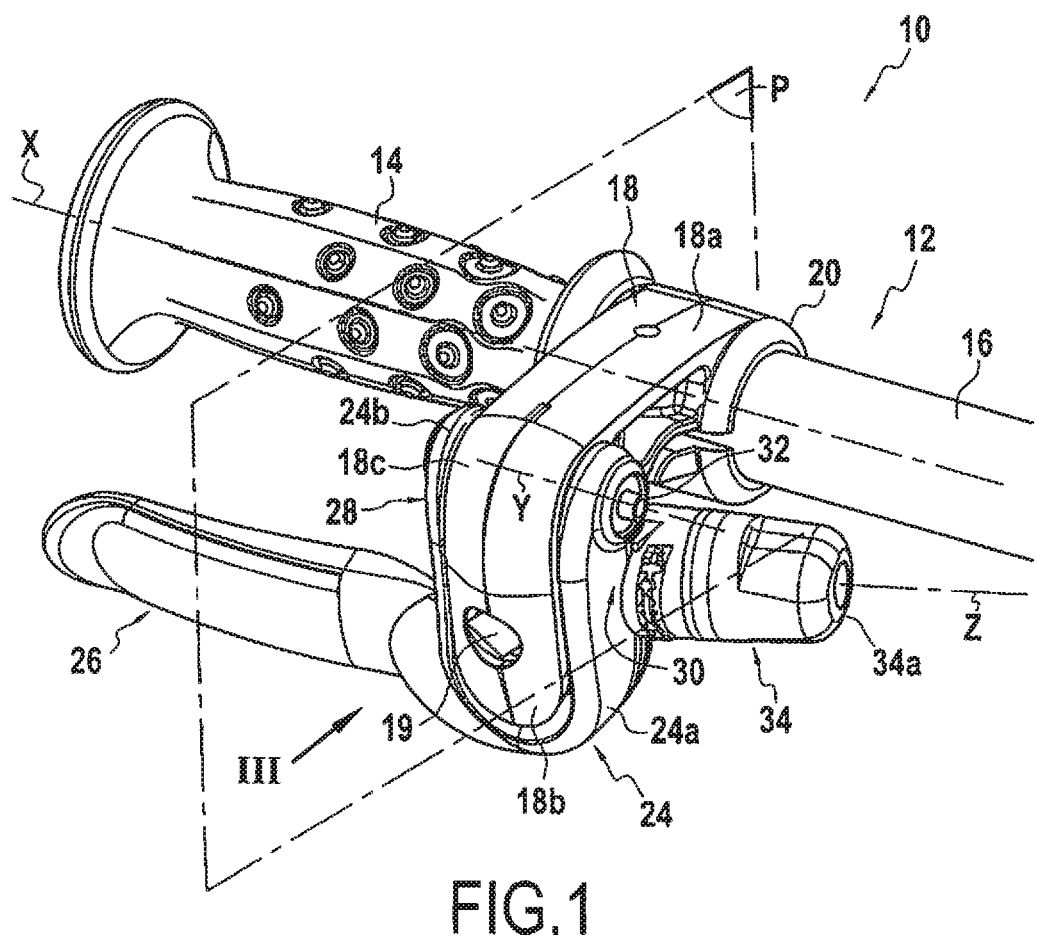
FIG. 1 is a perspective view of the braking device according to embodiments of the disclosure, in the rest position.

FIG. 1 shows a braking device 10 according to embodiments of the disclosure.

This braking device 10 is designed for mounting on a wheeled vehicle 100, such as a cycle, which has a handlebar 12 provided with at least one grip handle 14, enabling the user to manipulate the handlebar 12, and at least one brake that is actuatable via a brake cable C having a first end provided with a cable nipple Ca, and a second end. In known manner, the brake is designed to brake one of the wheels of the vehicle 100. In this example, the braking device 10 is fastened to a tube 16 of the handlebar 12, said tube 16 having an axis and the grip handle 14 being fastened to said tube of the handlebar 12.

The braking device further comprises a support that presents a first end 18a, a second end 18b opposite from the first end 18a, and a bend portion 18c. The first end 18a of the support 18 is provided with a fastener sleeve 20 making it possible to fasten the braking device to the tube 16 of the handlebar 12.

Figure 6:
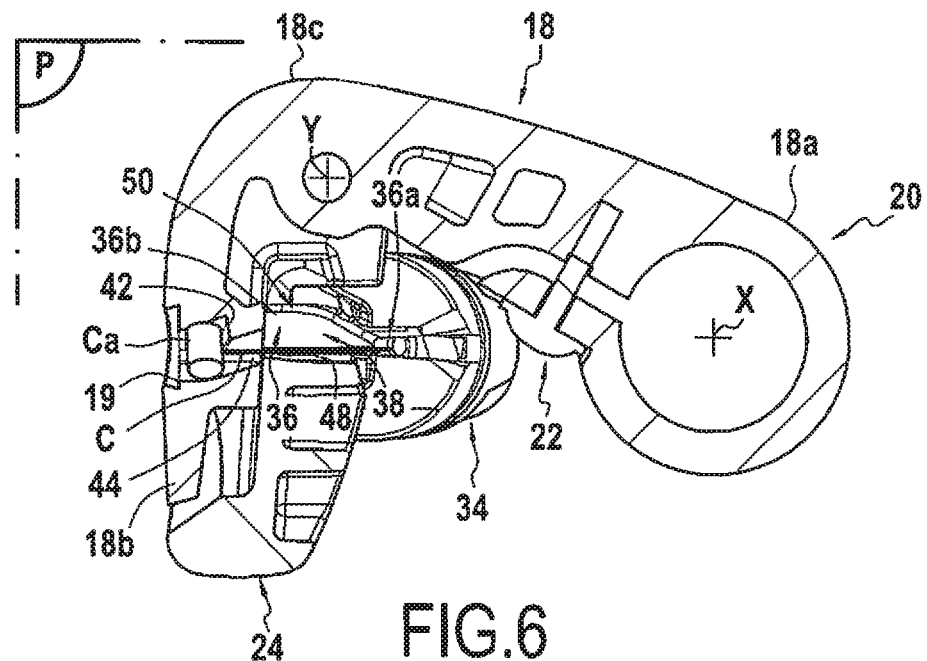
FIG. 6 is a view of the braking device according to embodiments of the disclosure in section on a plane perpendicular to the pivot axis, said braking device being shown in the rest position.

As can be observed in FIG. 6, the fastener sleeve is split and includes clamping means 22. The fastener sleeve presents the general shape of a cylinder that extends along an axis X. The fastener sleeve 20 is designed to clamp onto the tube 16 of the handlebar 12 of the vehicle, in such a manner that the axis X of the fastener sleeve 20 coincides with the axis of the tube 16 of the handlebar 12 and with the longitudinal axis of the grip handle 14. Without going beyond the ambit of the disclosure, the support 18 could be formed integrally with the tube of the handlebar.

Still in FIG. 6, it should be observed that the bend portion 18c of the support is situated between the first end 18a and the second end 18b of the support 18. Furthermore, the bend portion 18c forms approximately a right angle.

With reference once again to FIG. 1, it can be seen that, according to embodiments of the disclosure, the second end 18b of the support 18 includes a cavity 19 for receiving the nipple Ca of the brake cable C. This receiving cavity 19 is described in more detail below.

Figure 2:
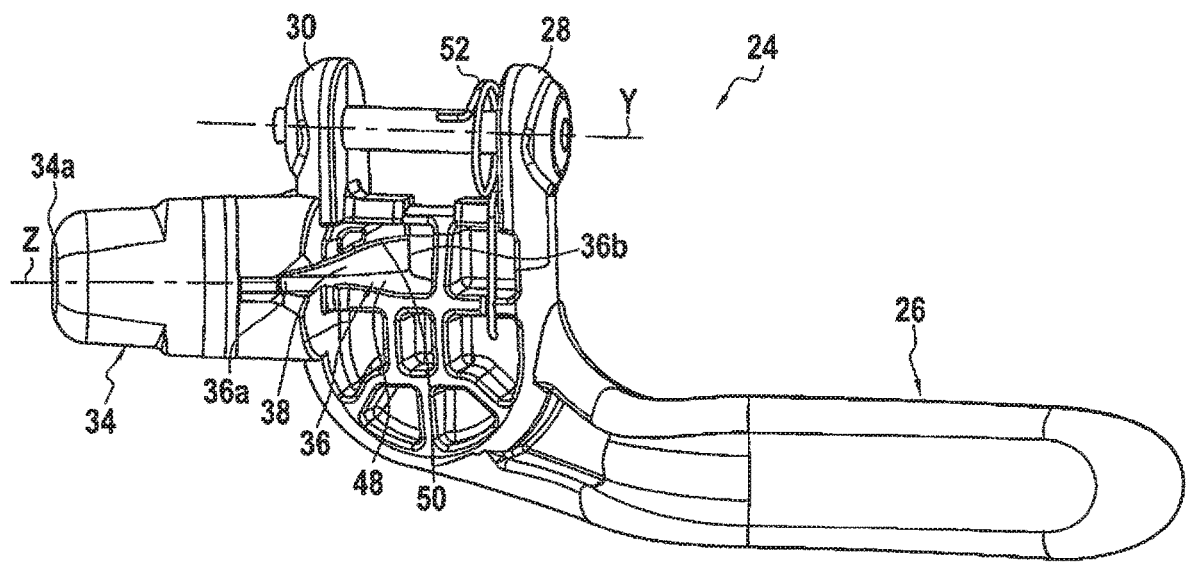
FIG. 2 shows the pivot body of the braking device according to embodiments of the disclosure.

According to embodiments of the disclosure, the braking device 10 further comprises a pivot body 24, shown in FIG. 2, which is mounted to pivot relative to the support about a pivot axis Y. The pivot axis Y is substantially parallel to the axis X of the fastener sleeve 20 and therefore to the longitudinal axis of the grip handle. This pivot axis Y is located in the bend portion 18c, between the first end 18a and the second end 18b of the support 18. Furthermore, the pivot axis Y passes through the bend portion 18c of the support 18.

The pivot body 24 includes a brake handle 26 extending substantially parallel to the axis X of the fastener sleeve 20, from a first end 24a of the pivot body 24. In other words, the brake handle 26 extends perpendicularly to the pivot body 24 from the first end 24a of the pivot body.

In particular, the brake handle 26 extends substantially parallel to the grip handle 14, substantially along its entire length.

In view of the above, it should be understood that the pivot axis Y, the axis X of the fastener sleeve 20, the longitudinal axis of the grip handle 14, and the brake handle 26 are all substantially parallel.

The first end 24a of the pivot body 24 is located opposite from a second end 24b of the pivot body, which is mounted on the support 18 by a pivot connection so as to pivot about the pivot axis Y. To this end, the second end of the pivot body comprises a pair of lugs 28, 30 that are located on opposite sides of the width of the bend portion 18c of the support 18.

The two lugs 28, 30 surround a fraction of the support that extends from the bend portion 18c to the second end 18b of the support. The end of each of the two lugs 28, 30 presents an orifice receiving a shaft 32 that passes through the bend portion 18c of the support 18 so as to constitute the pivot connection between the pivot body 24 and the support 18.

As can be seen in FIG. 2, the pivot body 24 further includes a guide member 34 for guiding the brake cable C in the pivot body. The guide member 34 presents a substantially cylindrical shape and extends along a guide axis Z, from a portion of the pivot body situated between the first end 24a of the pivot body 24 and the second end 24b of the pivot body 24. More precisely, when considered in the plane P that is perpendicular to the pivot axis, the guide member 34 is located between the pivot axis Y and the brake handle 26.

In addition, when considered in the plane P that is perpendicular to the pivot axis Y and in projection on an axis passing by the pivot axis Y and the axis X of the fastener sleeve 20, the guide member 34 is located between the pivot axis Y and the axis X of the fastener sleeve 20.

According to embodiments of the disclosure, the guide axis Z of the guide member 34 extends transversely relative to a plane that is perpendicular to the pivot axis Y. In particular, the brake handle 26 and the guide member 34 extend in opposite directions on either side of the support 18.

In other words, the guide member 34 lies within a volume defined by the fastener sleeve 20, the pivot axis Y, and the second end 18b of the support 18 and extending along the tube 16 of the handlebar 12, said volume defining substantially a prism on a triangular base. One advantage is to make the guide member 34 more compact and in particular to avoid it projecting towards the front of the vehicle. In particular, this configuration makes it possible to increase the dimensions of the guide member 34 without harming the ergonomics of the braking device 10.

In this example, the salient angle between the guide axis and the plane P that is perpendicular to the pivot axis is of about 60°.

In this non-limiting example, the guide member includes a thumbwheel for adjusting the tension of the brake cable C.

In addition, the pivot body 24 includes an inner recess 36, comprising a recess inlet 36a, a recess outlet 36b, and a preferably smooth side wall 38, the inner recess 36 serving to guide the brake cable in the pivot body. The inner recess 36 extends from the guide member 34, via the recess inlet 36a and leads to the receiving cavity 19 in the support 18, at the recess outlet 36b. In particular, the inner recess 36 describes a curve defined between the recess inlet 36a and the recess outlet 36b through about 125° in a first embodiment, and a curve through about 120° in a second embodiment. The cross-section of the inner recess 36 increases going from the guide member 34 towards the receiving cavity 19 and therefore from the recess inlet 36a towards the recess outlet 36b. Preferably, the cross-section of the inner recess 36, at the recess outlet 36b, is twice the size, and more preferably three times the size of the cross-section of the inner recess at the recess inlet 36a.

Figure 3:
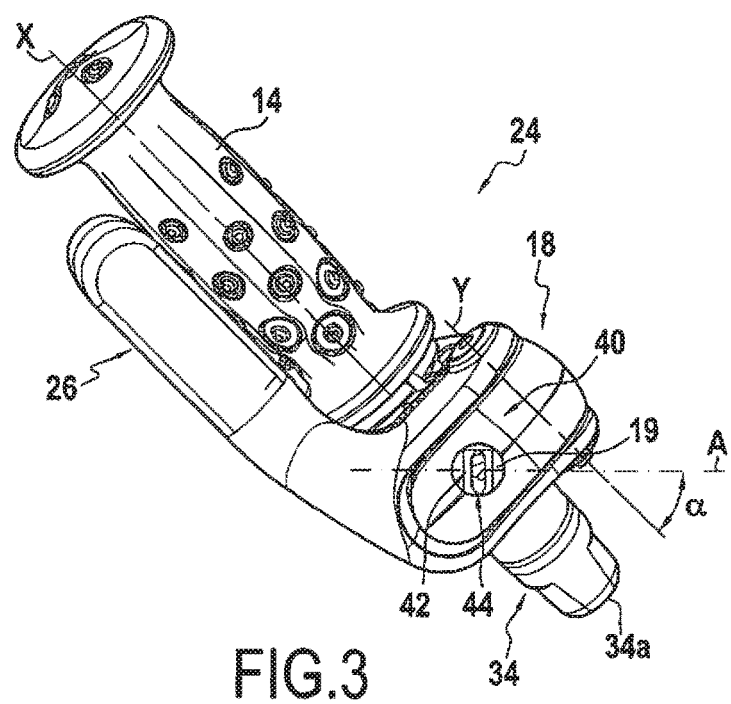
FIG. 3 is a front view of the braking device according to embodiments of the disclosure.

In FIG. 3, it should be observed that the cavity 19 for receiving the nipple Ca of the brake cable C leads to an outside surface 40 of the support 18 and thus faces away from the fastener sleeve 20. The receiving cavity 19 is located between the bend portion 18c of the support and the second end 18b of the support.

In the first embodiment, the distance between the pivot axis Y and the receiving cavity 19 is substantially equal to 22 millimeters (mm) and the distance between the pivot axis and guide member 34 is substantially equal to 18 mm. In the second embodiment, the distance between the pivot axis Y and the receiving cavity 19 is substantially equal to 32 mm and the distance between the pivot axis and guide member 34 is substantially equal to 27 mm.

Figure 4:
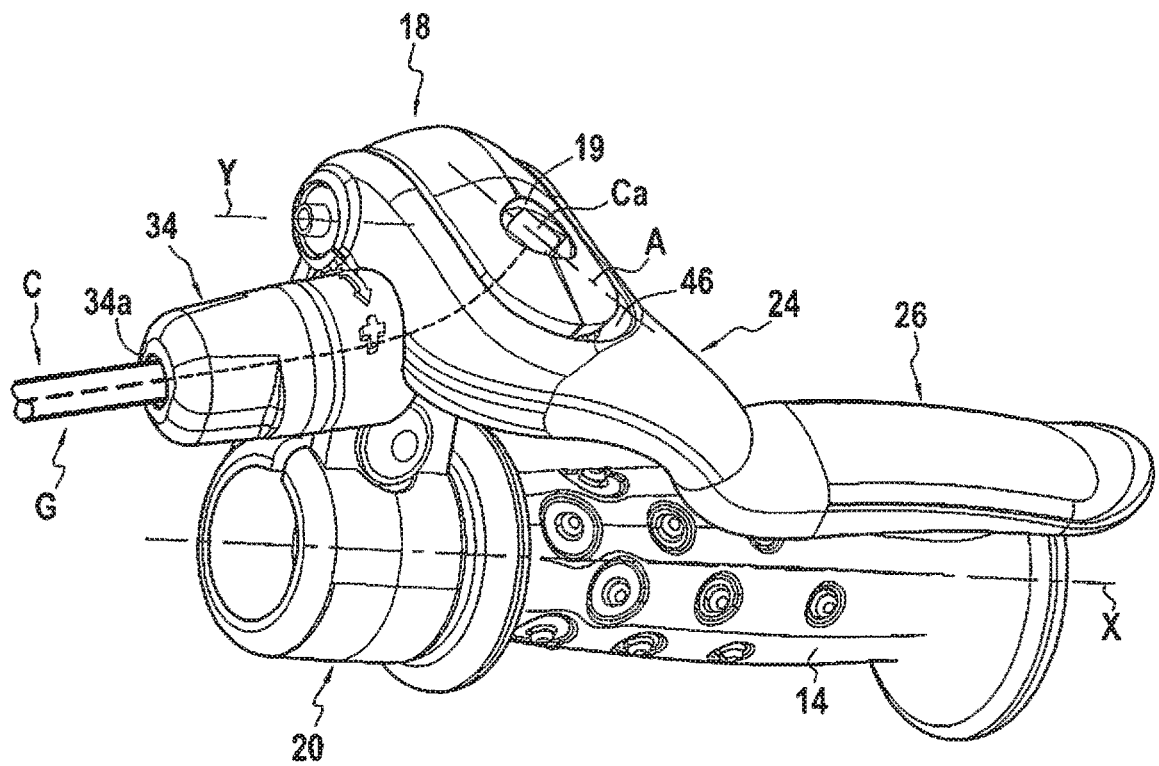
FIG. 4 is a perspective view of the braking device according to embodiments of the disclosure, provided with a brake cable, and shown in the rest position.
Figure 5:
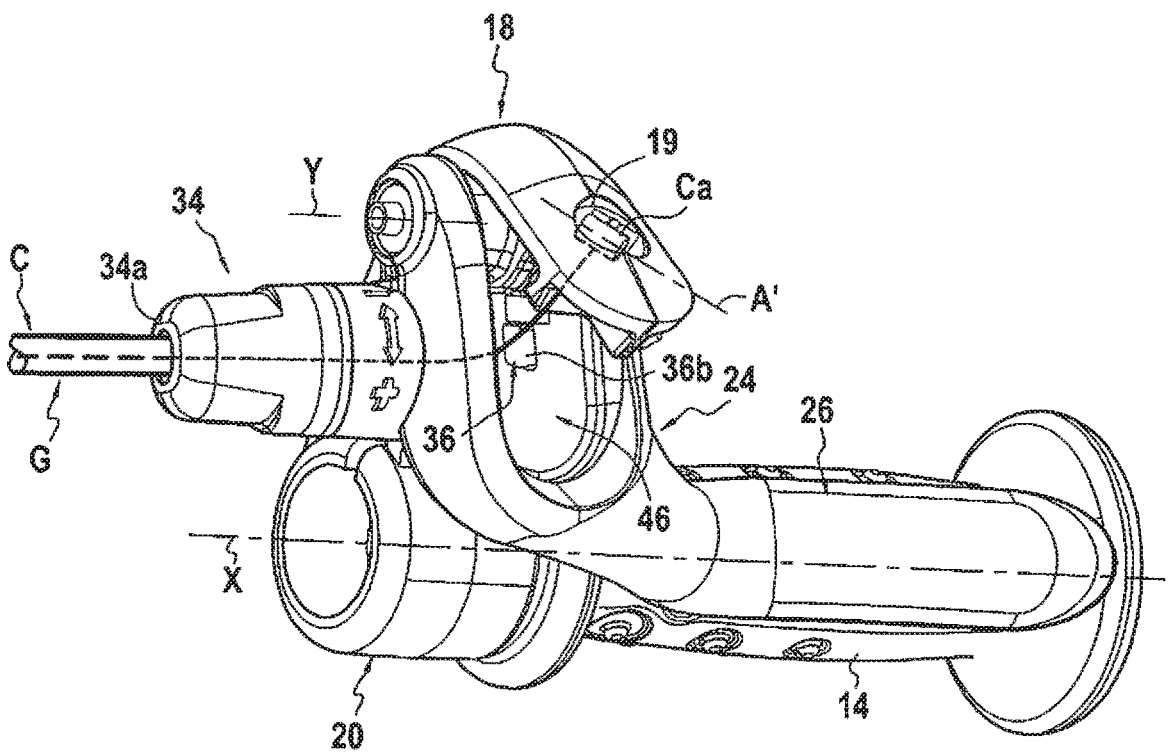
FIG. 5 is a perspective view of the braking device according to embodiments of the disclosure, provided with a brake cable, and shown in the actuated position.

The receiving cavity further includes an end wall 42 of partly cylindrical shape, preferably having the shape of a half-cylinder. The end wall 42 constitutes a bearing surface for the nipple Ca of the brake cable C, facing away from the fastener sleeve 20. The end wall 42 presents an axis A defined as the axis of the partly-formed cylinder. In particularly advantageous manner, the receiving cavity is configured so that the axis A of the end wall 42 of the receiving cavity 19 is inclined relative to the pivot axis Y, preferably at an angle α lying in the range 35° to 55°, more preferably at an angle α that is substantially equal to 45°. The support 18 further includes a slot 44 passing through the support and opening out into the receiving cavity. In the example of FIGS. 4 and 5, it should be observed that the nipple Ca of the brake cable C presents the shape of a cylinder having an axis A', cooperating with the end wall 42 of the receiving cavity 19. The receiving cavity is configured so that the end wall 42 serves to hold the nipple Ca of the brake cable C in the support 18, away from the fastener sleeve 20. Since the axis of the A end wall 42 of the receiving cavity 19 is inclined relative to the pivot axis, it should be understood that the axis A' of the nipple Ca of the brake cable C substantially coincides with the axis A of the end wall 42, so that the axis A' of the brake cable nipple is also inclined relative to the pivot axis Y.

Consequently, this configuration allows the brake cable nipple to pivot in the receiving cavity 19 about the axis A of the end wall 42, enabling the brake cable C to turn about the axis A of the end wall, when the brake handle 26 is actuated, said brake cable being guided in rotation in the slot 44 of the support 18.

The brake cable C passes through the slot 44 and extends substantially towards the fastener sleeve 20, transversely relative to the axis X of the fastener sleeve 20.

The brake cable also passes through the pivot body 24. More precisely, the brake cable C extends inside the pivot body through the inner recess 36, pressing tangentially against the side wall 38 of the inner recess 36, and also through the guide member 34, which serves to guide the brake cable C. The brake cable C enters the pivot body 24 at a first end 34a of the guide member 34 and exits at the recess outlet 36b.

As shown in FIG. 8, inside the pivot body 24, the brake cable C presents a curve of angle that is greater than 90° between the receiving cavity 19 and the guide member 34, preferably an angle lying in the range 90° to 130°, which makes it possible to limit friction of the brake cable C in the pivot body 24.

In addition, the guide member 34 and the brake handle 26 extend on opposite sides of the support 18, so that the brake cable C and the grip handle 14 extend in opposite directions. It should be understood that there is no risk of the brake cable C getting in the user's way when said user seeks to actuate the brake handle.

Furthermore, outside of the braking device 10, the brake cable C extends in known manner inside a sheath G. The first end of said sheath G is housed in the guide member 34, while the second end of the sheath G is fastened to the body of a brake caliper. The second nipple of the brake cable C is also connected, in known manner, to a movable portion of the brake caliper that is movable relative to the body of the brake caliper.

FIGS. 4 and 6 show a braking device 10 of the disclosure, in the rest position, in which the brake handle 26 is not actuated. The pivot body 24 comprises a housing 46 designed to cooperate with the support 18, by receiving a fraction of the support that extends between the bend portion 18c and the second end 18b of the support 18.

In this rest position of the braking device 10, the brake cable C extends in the recess 36 of the pivot body 24, pressing tangentially against the side wall 38, in the vicinity of a bottom wall 48 of the recess 36.

Figure 7:
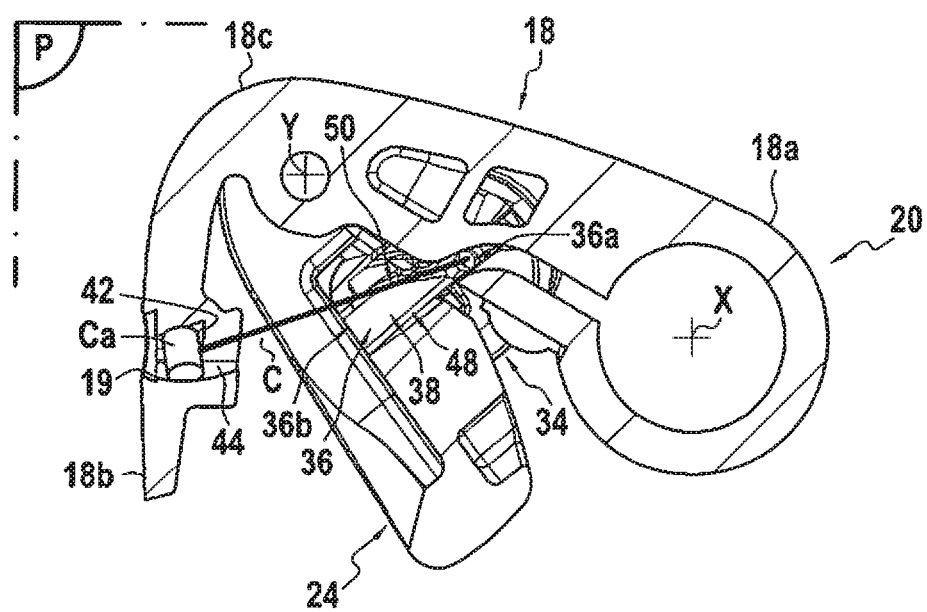
FIG. 7 is a view of the braking device according to embodiments of the disclosure in section on a plane perpendicular to the pivot axis, said braking device being shown in the actuated position.

When the brake handle is actuated, i.e. when the braking device 10 is moved from the rest position as shown in FIGS. 4 and 6 into an actuated position as shown in FIGS. 5 and 7, the pivot body 24 pivots about the pivot axis Y, which leads to a turning movement of the guide member 34 about the pivot axis Y. As a result, the guide member moves towards the fastener sleeve 20 and pushes on the sheath G, while the nipple Ca of the brake cable C is held in the receiving cavity 19. Actuating of the brake handle 26 thus has the effect of pushing the sheath G so that the brake cable C moves relative to the sheath G. It follows that the second nipple of the brake cable moves towards the second end of the sheath, thus pulling on the movable portion of the brake caliper.

Preferably, the angular stroke of the body 24 pivoting about the pivot axis Y, between the rest position of the braking device 10 and the actuated position of the braking device 10, is less than 90°, and more preferably less than 45°.

During actuation of the brake handle 26, the brake cable C slides in the inner recess 36 of the pivot body 24 and moves towards a top wall 50 of the inner recess 36. At the same time, the nipple Ca of the brake cable C pivots about the axis A of the bottom wall 42 of the receiving cavity 19, in such a manner that the brake cable is guided in the slot 44. By guiding the brake cable C in this manner, said cable slides into the inner recess 36 of the pivot body 24, from bottom to top and tangentially relative to the side wall 38 of the inner recess 36, throughout the actuation of the brake handle 26.

In other words, as a result of the angle of inclination of the axis A of the end wall 42 of the receiving cavity 19, and therefore as a result of the angle of inclination of the nipple Ca of the brake cable C relative to the pivot axis Y, the brake cable is always tangential relative to the side wall 38 of the inner recess 36, whatever the position of the brake handle 26. The brake cable slides tangentially along the side wall 38 of the inner recess 36. This configuration improves guidance of the brake cable C in the pivot body 24 and serves to avoid twisting of the brake cable, thereby limiting friction and facilitating braking of the vehicle.

FIGS. 5 and 7 show the braking device of the disclosure in the actuated position, i.e. in which the brake handle 26 has been actuated. The guide member 34 is positioned in the vicinity of the fastener sleeve 20. It should be observed that the brake cable C always presses tangentially against the side wall 38 of the inner recess 36, in the vicinity of the top wall 50 of the inner recess 36.

In addition, in order to pass from the actuated position to the rest position, the braking device 10 includes a return spring 52 that is mounted between the support 18 and the pivot body 24.

FIG. 8 is a section view, from below, showing the routing of the brake cable C from the guide member 34, inside the inner recess 36, and through the slot 44 of the support 18. It should be observed that the brake cable describes a circular arc having a gentle curve in such a manner that braking is improved.

FIG. 9 shows a wheeled vehicle 100 having a braking device 10 according to embodiments of the disclosure. In this non-limiting example, the vehicle 100 is a bicycle. Without going beyond the ambit of the disclosure, the vehicle 100 could be a motorized two-wheeled vehicle, or indeed a kick scooter.

The braking device 10 is mounted on the tube 16 of the handlebar 12 of the vehicle 100. Said vehicle has at least one wheel 110 secured to a frame 120 and a brake 130 that is associated with said wheel to brake it and that is connected to the braking device 10 via the brake cable C, moving relative to the sheath G. In particular, the first end of the sheath is housed in the guide member 34, while the second end of the sheath is fastened to the body of the brake caliper 130. The second nipple of the brake cable is also connected to the brake caliper 130.

Even though some features, concepts or aspects of the embodiments may be described herein as being a preferred (more or less) arrangement or method, or an advantageous arrangement or method, such description is not intended to suggest that such feature or features are required or necessary unless expressly so stated.

The invention claimed is:

1. A braking device for a vehicle having a handlebar with an axis and a brake cable with a nipple, said braking device comprising:
   a support presenting both a first end provided with a fastener sleeve for fastening to the handlebar, the fastener sleeve having an axis, and a second end; and
   a pivot body mounted on the support so as to pivot about a pivot axis that is substantially parallel to the axis of the fastener sleeve, the pivot body including a brake handle extending substantially parallel to the axis of the fastener sleeve;
   wherein the pivot body includes a guide member for guiding the brake cable into the pivot body, said guide member extending along an axis that is transverse to a plane that is perpendicular to the pivot axis, in that the second end of the support includes a receiving cavity for receiving the nipple of the brake cable, and in that the guide member and the brake handle extend on opposite sides of the support.

2. The braking device according to claim 1, wherein the guide member and the brake handle are located on opposite sides of a plane that is perpendicular to the axis of the fastener sleeve, said plane passing via the receiving cavity.

3. The braking device according to claim 1, wherein the support presents a bend portion formed between the first end of the support and the second end of the support, and wherein the pivot axis passes through the bend portion.

4. The braking device according to claim 1, wherein the support includes an outer surface and wherein the receiving cavity opens out into the outside surface of the support.

5. The braking device according to claim 1, wherein the fastener sleeve and the receiving cavity are located on opposite sides of a plane containing the pivot axis and passing through the guide member.

6. The braking device according to claim 5, wherein the receiving cavity is shaped in such a manner that, between the receiving cavity and the guide member, the brake cable presents a curve through an angle that is greater than 90° inside the pivot body.

7. The braking device according to claim 1, wherein the receiving cavity includes an end wall of partly cylindrical shape presenting an axis, the end wall being configured to receive the nipple of the brake cable.

8. The braking device according to claim 7, wherein the axis of the end wall of the receiving cavity is inclined relative to the pivot axis.

9. The braking device according to claim 1, wherein, when considered in a plane that is perpendicular to the pivot axis, the guide member is located between the pivot axis and the axis of the fastener sleeve.

10. The braking device according to claim 9, wherein, when considered in said plane that is perpendicular to the pivot axis, the guide member is located between the pivot axis and the brake handle.

11. The braking device according to claim 1, wherein a salient angle between the guide axis and the plane that is perpendicular to the pivot axis lies in the range 45° to 90°.

12. The braking device according to claim 1, wherein the guide member includes a thumbwheel for adjusting the tension of the brake cable.

13. The braking device according to claim 1, wherein the pivot body includes an inner recess for guiding the brake cable extending between the receiving cavity and the guide member.

14. The braking device according to claim 13, wherein the cross-section of said inner recess increases going from the guide member towards the receiving cavity.

15. The braking device according to claim 1, wherein a return spring is mounted between the support and the pivot body, and arranged so as to return the braking device to a rest position when the brake handle is not actuated.

16. A wheeled vehicle having at least one wheel secured to a frame including a handlebar and at least one brake associated with said wheel and actuatable via a brake cable having a nipple, said brake cable being located inside a sheath, said vehicle further including the braking device according to claim 1, the brake cable passing through the guide member and the nipple of the brake cable being located in the receiving cavity, a first end of the sheath being housed in the guide member while a second end of the sheath is fastened to the brake.

* * * * *